United States Patent
Zhang

(10) Patent No.: US 10,864,960 B2
(45) Date of Patent: Dec. 15, 2020

(54) PORTABLE DOUBLE FOLDING BICYCLE

(71) Applicant: Foling Zhang, Guangdong (CN)

(72) Inventor: Foling Zhang, Guangdong (CN)

( * ) Notice: Subject to any disclaimer, the term of this patent is extended or adjusted under 35 U.S.C. 154(b) by 81 days.

(21) Appl. No.: 16/147,895

(22) Filed: Oct. 1, 2018

(65) Prior Publication Data

US 2019/0031271 A1 Jan. 31, 2019

Related U.S. Application Data

(63) Continuation of application No. PCT/CN2016/089298, filed on Jul. 8, 2016.

(30) Foreign Application Priority Data

Apr. 18, 2016 (CN) .......................... 2016 1 0240441

(51) Int. Cl.
*B62K 15/00* (2006.01)
*B62J 1/08* (2006.01)
(Continued)

(52) U.S. Cl.
CPC ............... *B62K 15/008* (2013.01); *B62J 1/08* (2013.01); *B62K 21/16* (2013.01);
(Continued)

(58) Field of Classification Search
CPC .......... B62K 15/008; B62K 21/16; B62J 1/08; B62J 2001/085
See application file for complete search history.

(56) References Cited

U.S. PATENT DOCUMENTS 3,015,498 A * 1/1962 Tanaka ................. B62K 15/008 280/278
4,132,428 A * 1/1979 Lassiere ............... B62K 15/008 280/278
(Continued)

FOREIGN PATENT DOCUMENTS

CN 2639153 Y 9/2004
CN 200985068 Y 12/2007
(Continued)

OTHER PUBLICATIONS

International Search Report of PCT Patent Application No. PCT/CN2016/089298 dated Jan. 20, 2017.

*Primary Examiner* — Jacob D Knutson
*Assistant Examiner* — Michael R Stabley

(57) ABSTRACT

A portable Double Folding bicycle comprising a front wheel, a frame assembly and a rear wheel, the frame assembly comprises a handlebar, a front frame, a crossbar assembly, a rear frame and a saddle, the handlebar is detachably connected to the upper end of the front frame; and the crossbar assembly comprises a front crossbar, a middle crossbar and a rear crossbar, the rear end of the front crossbar is connected to the front end of the middle crossbar through a first folder, the rear end of the middle crossbar is connected to the front end of the rear crossbar through a second folder, and the saddle is detachably connected to the rear crossbar, with the inclination angle of the first folder being 58°-62°, and the inclination angle of the second folder being 89°-94°. The present invention facilitates the bicycle dragging and improves the overall usability of the bicycle.

17 Claims, 4 Drawing Sheets

(51) Int. Cl.
  *B62K 21/16* (2006.01)
  *B62M 1/36* (2013.01)
  *B62M 6/00* (2010.01)

(52) U.S. Cl.
  CPC ........... *B62J 2001/085* (2013.01); *B62M 1/36* (2013.01); *B62M 6/00* (2013.01)

(56) References Cited

U.S. PATENT DOCUMENTS

| | | | | |
|---|---|---|---|---|
| 4,182,522 A * | 1/1980 | Ritchie | ................ | B62K 15/008 280/278 |
| 5,398,955 A * | 3/1995 | Yeh | ..................... | B62K 15/006 280/278 |
| 5,836,602 A * | 11/1998 | Wang | .................. | B62K 15/008 280/287 |
| 8,430,414 B1 * | 4/2013 | Yap | ..................... | B62K 15/008 280/278 |
| 8,894,084 B1 * | 11/2014 | Yap | ..................... | B62K 15/008 280/278 |
| 9,457,865 B2 * | 10/2016 | Gerencser | ............ | B62K 15/008 |
| 9,475,537 B2 * | 10/2016 | Hartmann | ............ | B62K 15/008 |
| 9,963,186 B2 * | 5/2018 | Beistegui Chirapozu | ................... | B62K 15/008 |
| 2010/0212978 A1 * | 8/2010 | Huang | ................. | B62K 15/008 180/65.31 |
| 2016/0137254 A1 * | 5/2016 | Lee | ........................ | B62K 11/02 180/208 |
| 2016/0244120 A1 * | 8/2016 | Gerencser | ............ | B62K 15/008 |

FOREIGN PATENT DOCUMENTS

| | | |
|---|---|---|
| CN | 201023593 Y | 2/2008 |
| CN | 205010406 U | 2/2016 |
| CN | 105667684 A | 6/2016 |

* cited by examiner

US 10,864,960 B2

PORTABLE DOUBLE FOLDING BICYCLE

CROSS-REFERENCE TO RELATED APPLICATIONS

This application is a continuation application of International Patent Application No. PCT/CN2016/089298 filed on Jul. 8, 2016, which claim the benefit of Chinese Patent Application No. 201610240441.8 filed on Apr. 18, 2016, all of which are incorporated herein by reference in their entirety.

TECHNICAL FIELD

The invention relates to the technical field of bicycle, in particular to a portable Double Folding bicycle.

BACKGROUND

Nowadays, folding bicycles are widely used as a riding tool for travel, shopping and commutation. However, such bicycles are not convenient for taking along. Moreover, even after being folded, the bicycles must be controlled by both hands all the time. When suitcases, shopping bags and other items are brought together with a bicycle, it's too troublesome. Besides, the bicycle folded in half takes up a large space on buses, subways, ships and so on, all of which will reduce the usability of the bicycle.

Therefore, it is necessary to remedy the above defects.

SUMMARY OF THE INVENTION

The invention provides a portable Double Folding bicycle, which solves the problem of poor usability of the bicycle in the prior art.

The technical solution of the invention is realized by:

a portable Double Folding bicycle, comprising a front wheel, a frame assembly and a rear wheel connected sequentially, wherein the frame assembly comprises a handlebar, a front frame, a crossbar assembly, a rear frame and a saddle, the front wheel is connected to the front frame, the handlebar is detachably connected to the upper end of the front frame, the rear wheel is connected to the rear frame; and the crossbar assembly comprises a front crossbar, a middle crossbar and a rear crossbar sequentially connected from front to rear, the front end of the front crossbar is fixedly connected to the front frame, the rear end of the front crossbar is connected to the front end of the middle crossbar through a first folder, the rear end of the middle crossbar is fixedly connected to the front end of the rear crossbar through a second folder, the rear end of the rear crossbar is fixedly connected to the rear frame, and the saddle is detachably connected to the rear crossbar, with the inclination angle of the first folder being A)($58°≤A≤62°$, and the inclination angle of the second folder being B)($89°≤B≤94°$.

Further, A equals $60°$ and B equals $93°$.

Further, the handlebar is detachably connected to the front frame through a handlebar stem.

Further, the handlebar stem is a telescopic stem.

Further, the saddle is detachably connected to the rear crossbar through a saddle post.

Further, the saddle post is a telescopic post.

Further, at least one jack is arranged on the crossbar assembly.

Further, the rear frame is provided with pedals.

Further, the rear frame is provided with a motor driver.

According to the above technical solution, the first folder and the second folder are arranged on the crossbar assembly, with the inclination angle of the first folder being set to $58°$-$62°$, and the inclination angle of the second folder being set to $89°$-$94°$. In this way, the folded handlebar can be inclined backward and dragged conveniently after the bicycle is folded, and the front wheel and the rear wheel can be fit coaxially for convenient dragging in parallel. Meanwhile, the handlebar and the saddle can also be detached and placed into a backpack together with the folded bicycle, thus achieving a more convenient travel and improving the overall usability of the bicycle.

BRIEF DESCRIPTION OF THE DRAWINGS

In order to clearly describe the embodiments of the invention or the technical solution in the prior art, the embodiments or drawings used in technical description will be simply introduced as follows. Apparently, the drawings described below are only some embodiments of the invention. Those of ordinary skill in the art can obtain other drawings based on these drawings without creative work.

Figure 1:
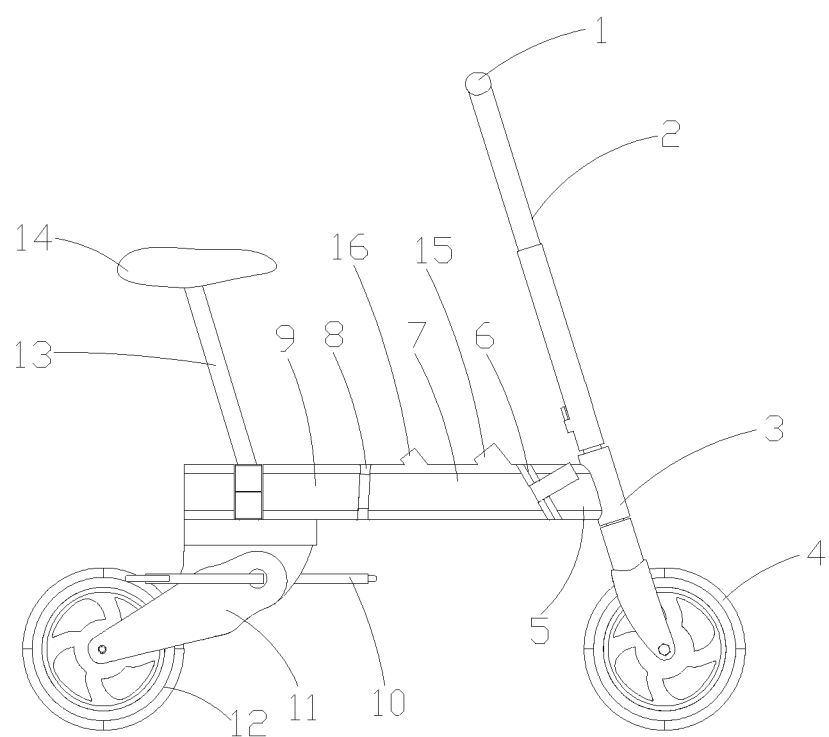
FIG. 1 is a structural diagram of a left view of one embodiment of a portable Double Folding bicycle according to the present invention.
Figure 2:
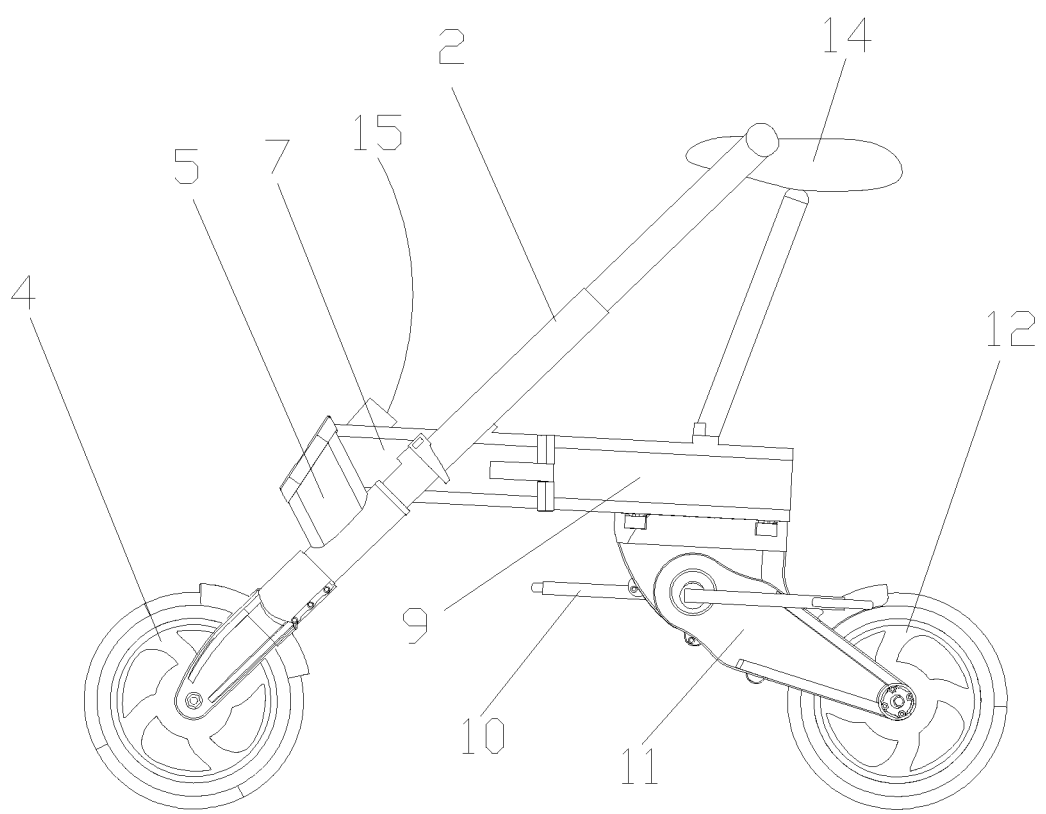
FIG. 2 is a structural diagram of a portable Double Folding bicycle of the present invention with the front wheel folded backward.

PARTS AND THEIR NUMBERS 1. handlebar; 2. handlebar stem; 3. front frame; 4. front wheel; 5. front crossbar; 6. first folder; 7. middle crossbar; 8. second folder; 9. rear crossbar; 10. pedal; 11. rear frame; 12. rear wheel; 13. saddle post; 14. saddle.

DETAILED DESCRIPTION OF THE PREFERRED EMBODIMENT

The technical solution in the embodiments of the invention will be described clearly and completely as follows. Apparently, the embodiments described herein are only some embodiments of the invention, but not all embodiments. Based on the examples of the invention, all other examples obtained by those of ordinary skill in the art without creative work shall fall within the protection scope of the invention.

Referring to FIG. 1 to FIG. 4, the present invention provides a portable double folding bicycle comprising a front wheel 4, a frame assembly and a rear wheel 12 connected sequentially, wherein the frame assembly comprises a handlebar 1, a front frame 3, a horizontal crossbar assembly, a rear frame 11 and a saddle 14, the front wheel 4 is connected to the front frame 3, the handlebar 1 is detachably connected to the upper end of the front frame 3, the rear wheel 12 is connected to the rear frame 11, the horizontal crossbar assembly comprises a front crossbar 5, a middle crossbar 7 and a rear crossbar 9 sequentially connected from front to back, the front end of the front crossbar 5 is fixedly connected to the front frame 3, the rear end of the front crossbar 5 is connected to the front end of the middle crossbar 7 through a first folder 6, the rear end of the middle crossbar 7 is connected to the front end of the rear crossbar 9 through a second folder 8, the rear end of the rear crossbar 9 is fixedly connected to the rear frame 11, and the saddle 14 is detachably connected to the rear crossbar 9; with the inclination angle of the first folder 6 in reference to the horizontal crossbar assembly being A ($58°\leq A\leq 62°$) and the inclination angle of the second folder 8 in reference to the horizontal crossbar assembly being B ($89°\leq B\leq 94°$).

According to the technical solution, the crossbar assembly is of a double folding structure. The inclination angle of the first folder 6 is set to 58°-62°, and the inclination angle of the second folder 8 is set to 89°-94° such that both the first folder 6 and the second folder 8 are inclined backward. When the backward inclination angle of the second folder 8 is set to 90°-94°, that is, the forward inclination angle of the second folder 8 is set to 86°-90°, the handlebar 1 can be inclined backward after being folded and the bicycle can be dragged conveniently. After the front wheel 4 and the rear wheel 12 of the technical solution are folded, the front wheel 4 and the rear wheel 12 are on the same axis. After the second folder 8 is folded, the middle crossbar 7 and the rear crossbar 9 are disposed in a side-by-side relationship. In use, the front wheel 4 is folded backward and the rear wheel 12 is folded forward, thus saving the space occupied by the bicycle; and the front wheel 4 and the rear wheel 12 have the same diameter, and then the saddle 14 is detached and plugged into a jack 15 to drag the bicycle smoothly. To place the bicycle in a backpack, the handlebar 1 is disassembled and inserted into another jack 16. Then, the folded bicycle has a rectangular structure and can be conveniently placed in the backpack. Both the first folder 6 and the second folder 8 are two-way folders, which can satisfy different folding habits. This structure is beneficial to easy disassembling and folding, thus achieving a convenient travel. A method of folding the portable double folding bicycle includes folding the front wheel 4 backward in one way about the first folder 6 until the front crossbar 5 is disposed on one side of the middle crossbar 7; and folding the rear wheel 12 forward in one way about the second folder 8 until the rear crossbar 9 is disposed on another side of the middle crossbar 7.

More specifically, A equals 60°, B equals 93°, the front wheel 4 and the rear wheel 12 are 25 cm in diameter, the front wheel 4 and the rear wheel 12 are not higher than 60 cm after being folded and placed in the backpack, and do not damage the backpack as they are put in the bottom.

The handlebar 1 is detachably connected to the front frame 3 through the handlebar stem 2, which is a telescopic stem. Thus, the height of the handlebar can be adjusted, and the left and right handles on the handlebar 1 are of a foldable or detachable structure so that the space occupied by the folded bicycle can be fully reduced.

The saddle 14 is detachably connected to the rear crossbar 9 through a saddle post 13, which is a telescopic post. Thus, the height of the saddle can be adjusted to further reduce the space occupied by the folded bicycle.

At least one jack is arranged on the crossbar assembly. In this specific embodiment, two jacks 15, 16 are preferred, one for inserting the handlebar stem 2 and the other for inserting the saddle post 13. With the jacks, the handlebar 1 and the saddle 14 can be placed, thus saving the space occupied by the folded handlebar 1 and the saddle 14.

The rear frame 11 is provided with two pedals 10 and one motor driver. The bicycle is driven forward by the pedals 10. The motor driver can reduce the physical output of people. The motor driver comprises a driving power supply and a driving motor. In use, the driving power supply can be installed in the rear crossbar according to the actual installation requirements, thus saving more space.

Several structural forms are provided as follows:

1. Non-folding structure: i.e. a normal riding structure, as shown in FIG. 1.

Figure 3:
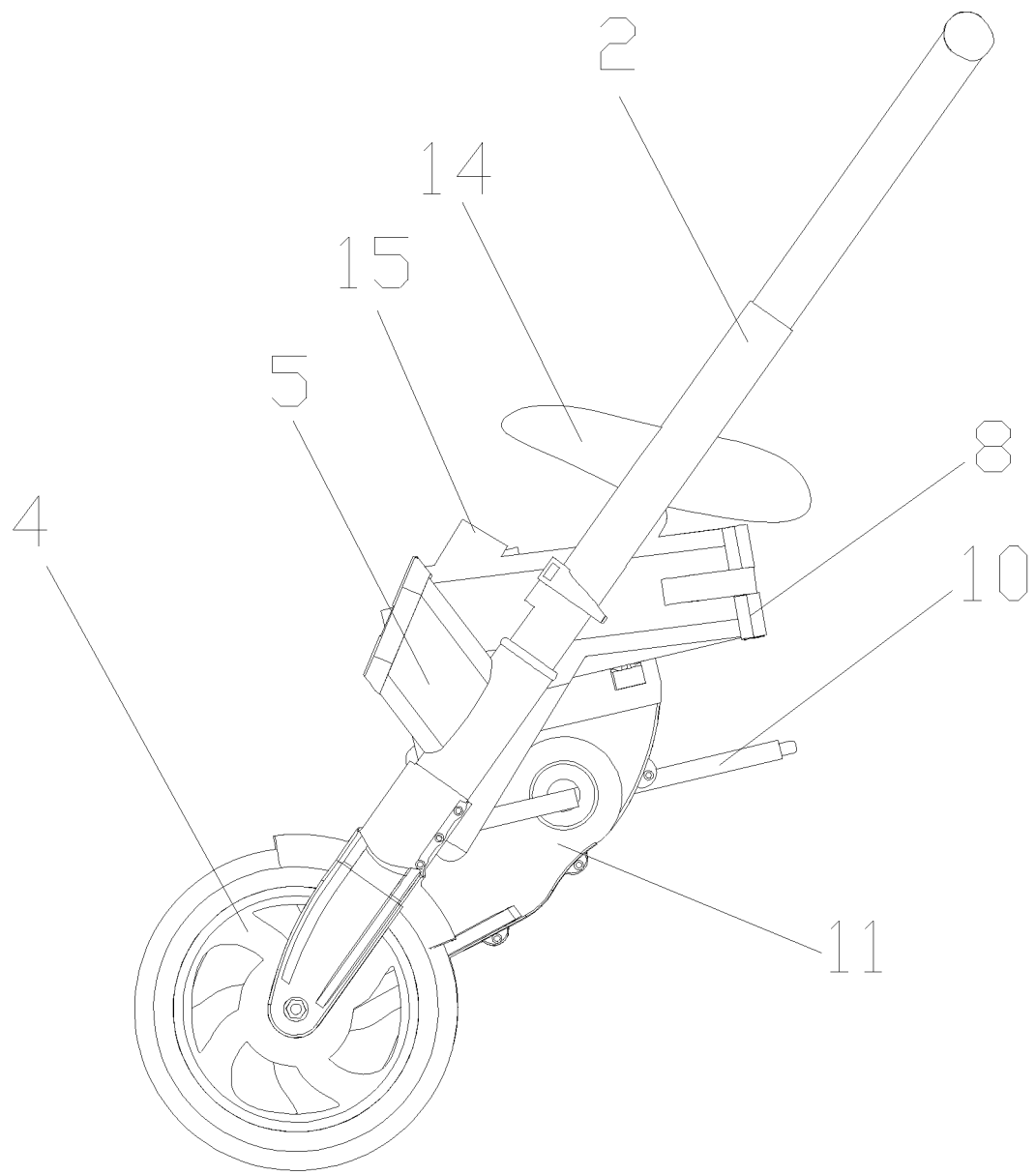
FIG. 3 is a structural diagram of a portable Double Folding bicycle according to the present invention when it is dragged after being folded.

2. Dragging structure: The front wheel 4 and the rear wheel 12 are fit coaxially with the first folder 6 and the second folder 8 rotated, and the saddle 14 is detached and plugged into the jack to reduce the space and drag with the handlebar, as shown in FIG. 3.

Figure 4:
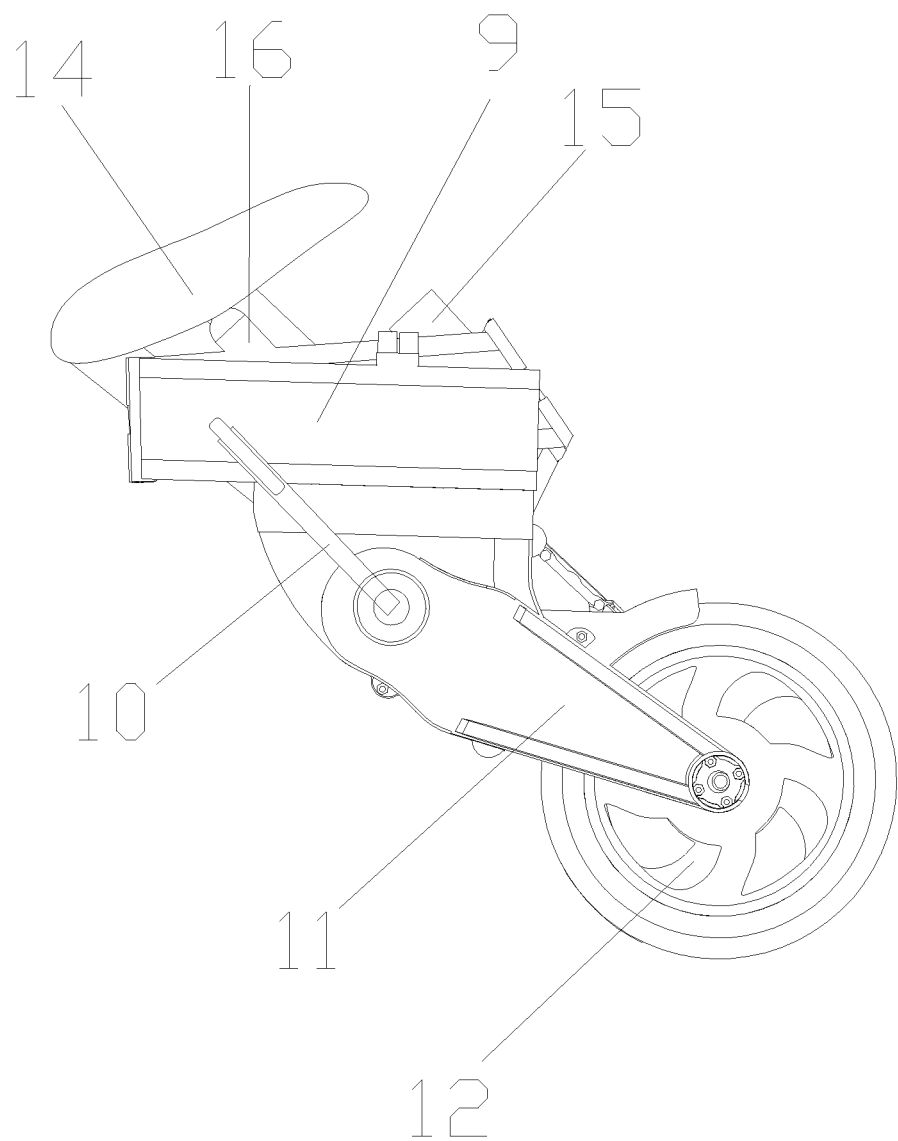
FIG. 4 is a structural diagram of a portable Double Folding bicycle according to the present invention when it is folded and placed in a backpack.

3. Portable structure: on the basis of the dragging structure, the handlebar 1 is further detached and plugged into the jack and the bicycle is placed into the backpack, as shown in FIG. 4.

To sum up, the first folder 6 and the second folder 8 are arranged on the crossbar assembly, with the inclination angle of the first folder 6 being 58°-62°, and the inclination angle of the second folder 8 being 89°-94°. In this way, the folded handlebar 1 can be inclined backward for convenient dragging, and the front wheel 4 and the rear wheel 12 can be fit coaxially for convenient dragging in parallel. Moreover, the handlebar 1 and the saddle 14 can also be detached and placed into the backpack together with the folded bicycle, thus achieving a more convenient travel and improving the overall usability of the bicycle.

The above mentioned embodiments are only preferred embodiments of the invention, which are not used to limit the invention. Any modification, equivalent replacement and improvement made within the range of the spirit and rule of the invention shall be incorporated in the protection scope of the invention.

The invention claimed is:

1. A portable double folding bicycle, comprising a front wheel (4), a frame assembly and a rear wheel (12) connected sequentially, wherein the frame assembly comprises a handlebar (1), a front frame (3), a horizontal crossbar assembly, a rear frame (11) and a saddle (14), the front wheel (4) is connected to the front frame (3), the handlebar (1) is detachably connected to the upper end of the front frame (3), the rear wheel (12) is connected to the rear frame (11), and the horizontal crossbar assembly comprises a front crossbar (5), a middle crossbar (7) and a rear crossbar (9) sequentially connected from front to back, the front end of the front crossbar (5) is fixedly connected to the front frame (3), a rear end of the front crossbar (5) is connected to a front end of the middle crossbar (7) through a first two-way folder (6), a rear end of the middle crossbar (7) is connected to a front end of the rear crossbar (9) through a second two-way folder (8); a rear end of the rear crossbar (9) is fixedly connected to the rear frame (11), and the saddle (14) is detachably connected to the rear crossbar (9), with the inclination angle of the first two-way folder (6) in reference to the horizontal crossbar assembly being A, and $58°\leq A\leq 62°$; the inclination angle of the second two-way folder (8) in reference to the horizontal crossbar assembly being B, and $89°\leq B\leq 94°$, wherein after the second two-way folder (8) is folded, the middle crossbar (7) and the rear crossbar (9) are disposed in a side-by-side relationship.

2. The portable double folding bicycle of claim 1, wherein A equals 60° and B equals 93°.

3. The portable double folding bicycle of claim 2, wherein the handlebar (1) is detachably connected to the front frame (3) through a handlebar stem (2).

4. The portable double folding bicycle of claim 3, wherein the handlebar stem (2) is a telescopic stem.

5. The portable double folding bicycle of claim 2, wherein the saddle (14) is detachably connected to the rear crossbar (9) through a saddle post (13).

6. The portable double folding bicycle of claim 5, wherein the saddle post (13) is a telescopic post.

7. The portable double folding bicycle of claim 2, wherein at least one jack is arranged on the horizontal crossbar assembly.

8. The portable double folding bicycle of claim 2, wherein the rear frame (11) is provided with pedals.

9. The portable double folding bicycle of claim 2, wherein the rear frame (11) is provided with a motor driver.

10. The portable double folding bicycle of claim 1, wherein the handlebar (1) is detachably connected to the front frame (3) through a handlebar stem (2).

11. The portable double folding bicycle of claim 10, wherein the handlebar stem (2) is a telescopic stem.

12. The portable double folding bicycle of claim 1, wherein the saddle (14) is detachably connected to the rear crossbar (9) through a saddle post (13).

13. The portable double folding bicycle of claim 12, wherein the saddle post (13) is a telescopic post.

14. The portable double folding bicycle of claim 1, wherein at least one jack is arranged on the horizontal crossbar assembly.

15. The portable double folding bicycle of claim 1, wherein the rear frame (11) is provided with pedals.

16. The portable double folding bicycle of claim 1, wherein the rear frame (11) is provided with a motor driver.

17. A method of folding the portable double folding bicycle of claim 1, comprising: folding the front wheel (4) backward in one way about the first two-way folder (6) until the front crossbar (5) is disposed on one side of the middle crossbar (7); and folding the rear wheel (12) forward in one way about the second two-way folder (8) until the rear crossbar (9) is disposed on another side of the middle crossbar (7).

\* \* \* \* \*